United States Patent [19]

Tokumaru et al.

[11] Patent Number: 4,846,562

[45] Date of Patent: * Jul. 11, 1989

[54] ZOOM LENS SYSTEM

[75] Inventors: Hisashi Tokumaru; Shuji Ogino, both of Osaka, Japan

[73] Assignee: Minolta Camera Kabushiki Kaisha, Osaka, Japan

[ * ] Notice: The portion of the term of this patent subsequent to May 27, 2003 has been disclaimed.

[21] Appl. No.: 148,673

[22] Filed: Jan. 26, 1988

Related U.S. Application Data

[60] Division of Ser. No. 842,661, May 15, 1986, Pat. No. 4,759,617, which is a continuation of Ser. No. 445,528, Nov. 30, 1982, Pat. No. 4,591,235.

[30] Foreign Application Priority Data

Nov. 30, 1981 [JP] Japan ............................ 56-192492

[51] Int. Cl.$^4$ .......................................... G02B 15/177
[52] U.S. Cl. ...................................... 350/426; 350/427
[58] Field of Search ................. 350/426, 427, 428, 423

[56] References Cited

U.S. PATENT DOCUMENTS

| | | | |
|---|---|---|---|
| 3,051,052 | 8/1962 | Bergstein | 350/423 |
| 3,433,559 | 3/1969 | Vockenhuber et al. | 350/427 |
| 3,454,321 | 7/1969 | Klein | 350/423 |
| 3,771,853 | 11/1973 | Nakamura | 350/426 |
| 3,884,555 | 5/1975 | Suwa et al. | 350/428 |
| 4,198,126 | 4/1980 | Abe et al. | 350/428 |
| 4,516,839 | 5/1985 | Tokumaru | 350/427 |

FOREIGN PATENT DOCUMENTS

| | | | |
|---|---|---|---|
| 55-14403 | 4/1980 | Japan . | |
| 2080966A | 2/1982 | United Kingdom | 350/423 |

Primary Examiner—Bruce Y. Arnold
Assistant Examiner—Terry S. Callaghan
Attorney, Agent, or Firm—Price, Gess & Ubell

[57] ABSTRACT

A zoom lens system of a relatively high zoom ratio about 2.5 to 3.5 ranging to a wide field angle such as 76 degrees is disclosed. The zoom lens system comprises, from the object to the image side, a first movable negative lens group, a second movable positive lens group, a third stationary negative lens group and a fourth movable positive lens group with a first to third variable air spaces formed therebetween, respectively. And, the zoom lens system functions as an inverted telephoto type lens system in the shorter focal length range of the whole lens system by means of a combination of only the first lens group as a front negative group and the whole of the second to fourth lens groups as a rear positive group, while the zoom lens system functions as a telephoto type lens system in the longer focal length range of the whole lens system by means of a combination of the whole of the first and second lens groups as a front positive group and the whole of the third and fourth lens groups as a rear negative group.

4 Claims, 9 Drawing Sheets f=82.5
⟨L⟩
F/4.63
−0.5    0.5
Spherical Aberration y'=21.63
(ω=14.7°)
−0.5    0.5
Astigmatism y'=21.63
−5    5    (%)
Distortion f=50.0
⟨M⟩
F/4.0
−0.5    0.5
Spherical Aberration y'=21.63
(ω=23.4°)
−0.5    0.5
Astigmatism y'=21.63
−5    5    (%)
Distortion f=28.8
⟨S⟩
F/3.6
−0.5    0.5
Spherical Aberration y'=21.63
(ω=36.9°)
−0.5    0.5
Astigmatism y'=21.63
−5    5    (%)
Distortion

FIG.11a
FIG.11b
FIG.11c
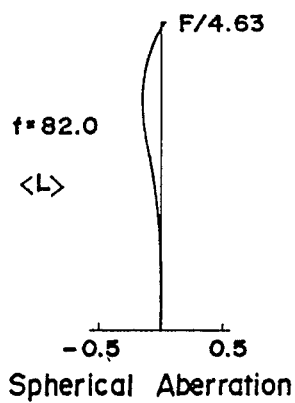
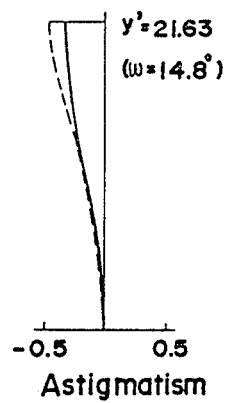
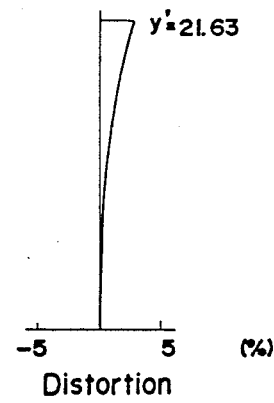
FIG.12a
FIG.12b
FIG.12c
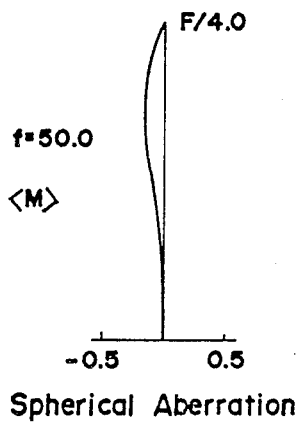
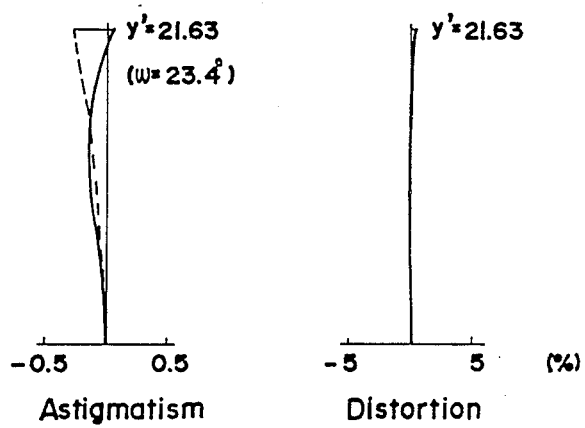
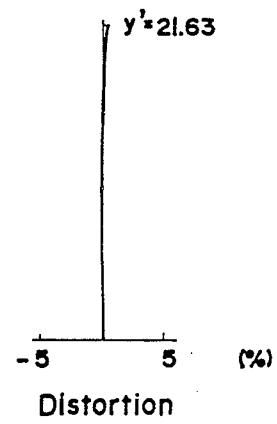
FIG.13a
FIG.13b
FIG.13c
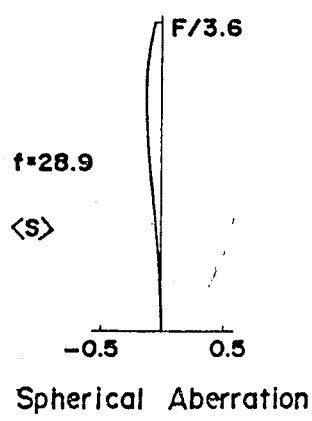
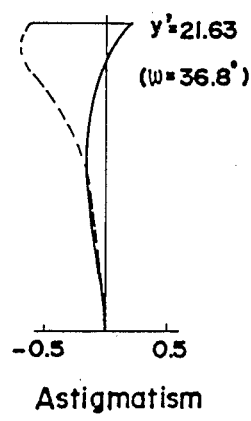
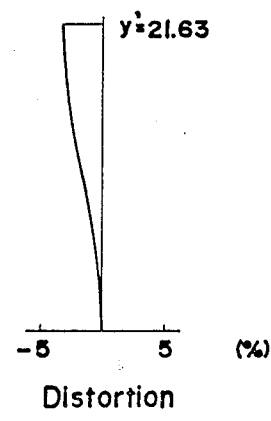

f=82.5

<L>

Spherical Aberration

Astigmatism

Distortion f=50.0

<M>

Spherical Aberration

Astigmatism

Distortion f=28.8

<S>

Spherical Aberration

Astigmatism

Distortion

FIG.20a
FIG.20b
FIG.20c
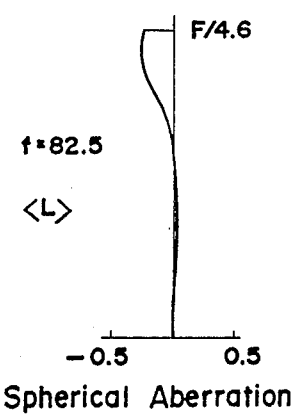
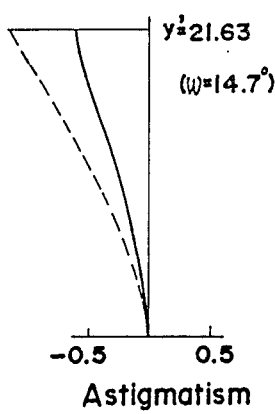
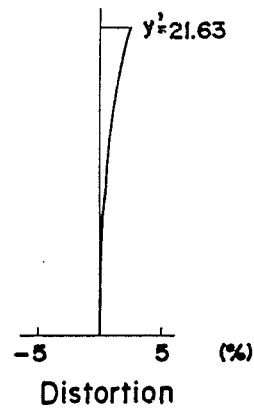
FIG.21a
FIG.21b
FIG.21c
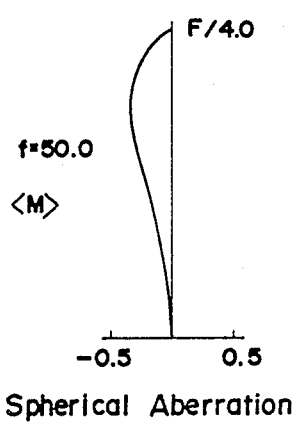
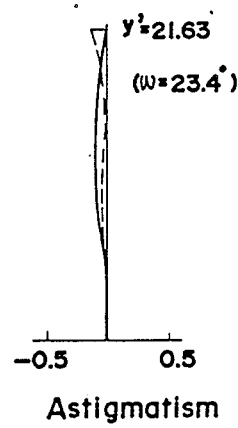
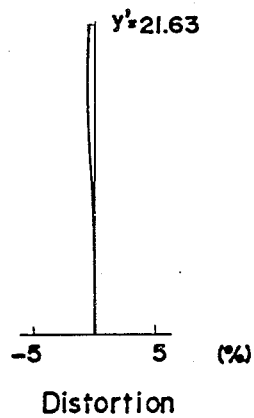
FIG.22a
FIG.22b
FIG.22c
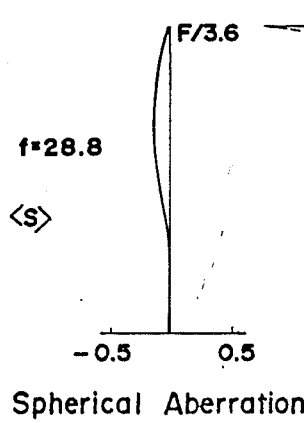
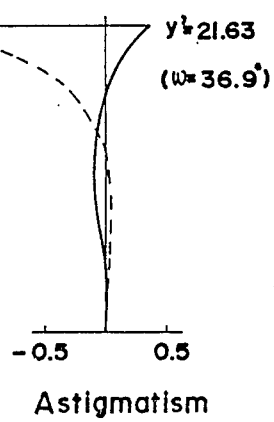
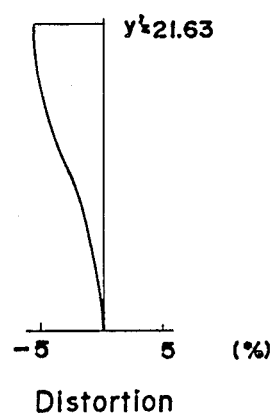

f=102.0
⟨L⟩
F/4.6
−0.5  0.5
Spherical Aberration y'=21.63
(ω=12.0°)
−0.5  0.5
Astigmatism y'=21.63
−5  5  (%)
Distortion f=55.0
⟨M⟩
F/4.0
−0.5  0.5
Spherical Aberration y'=21.63
(ω=21.5°)
−0.5  0.5
Astigmatism y'=21.63
−5  5  (%)
Distortion f=28.8
⟨S⟩
F/3.6
−0.5  0.5
Spherical Aberration y'=21.63
(ω=36.9°)
−0.5  0.5
Astigmatism y'=21.63
−5  5  (%)
Distortion

ZOOM LENS SYSTEM

This is a division of application Ser. No. 842,661, filed on May 15, 1986 (issued as U.S. Pat. No. 4,759,617), which is a continuation of Ser. No. 445,528, filed on Nov. 30, 1982 (issued as U.S. Pat. No. 4,591,235 on May 27, 1986).

BACKGROUND OF THE INVENTION

1. Field of the Invention

The present invention relates to a zoom lens system of a high zoom ratio about 3 ranging from a telephoto to a considerably wide field angle for use in a still camera, such as 35 mm SLR cameras.

2. Description of the Prior Art

In this field of art, there has been various attempts to provide a zoom lens system of relatively high zoom ratio ranging to wide field angle. Prior art zoom lens systems provided through such attempts can be roughly classified into two types, the first one having a negative front lens group, while the second one having a positive front lens group.

The first type is in its nature favorable to the purpose of providing the wide angle zoom lens system ranging to a considerably wide field angle, while it is unfavorable to the reduced total length and the compactness of the lens system. A most popular and simplified zoom lens system classified into the first type is a so-called two-group zoom lens system consisting of a negative front lens group and a positive rear lens group. Although such a two-group zoom lens system is suitable for a limited zoom ratio, such as 2, it is difficult to further increase the zoom ratio.

On the other hand, in the second type of zoom lens system with the front positive lens group, if the zoom range is tried to reach a focal length less than the length of diagonal line of the effective image plane, the focusing by means of moving the front positive lens group is difficult or the diameter of the front positive lens group is excessively increased. A typical example of zoom lens system classified into the second type is a so-called four-group zoom lens system consisting of a front focusing lens group movable for focusing but left stationary upon zooming, a variator lens group movable for zooming, a compensator lens group movable for zooming and a stationary relay lens group. In such a four-group zoom lens system, if the zoom range is tried to extend to a focal length less than 40 mm with the focusing capability by means of the front lens group and the compactness of the whole lens system maintained, the focal lengths of the front lens group and the variator lens group become excessively short to cause various aberrations which are difficult to be sufficiently corrected.

An example of a zoom lens system of a high zoom ratio ranging from a telephoto to wide field angle is disclosed in Japanese Patent Publication No. 55-14403. A co-pending U.S. Patent Application Ser. No. 393,492 (issued as U.S. Pat. No. 4,516,839) is another example of such a zoom lens system.

The prior art is still seeking to provide a relatively compact and economical zoom lens system having a relatively high zoom ratio ranging to the wide angle range with adequate optical correction.

SUMMARY OF THE INVENTION

An object of the present invention is to provide a zoom lens system with a relatively high zoom ratio about 2.5 to 3.5 ranging to a wide field angle about 76 degrees while maintaining a compact size.

Another object of the present invention is to provide a zoom lens system with aberrations well corrected across the entire zoom range.

According to the present invention, the zoom lens system comprises, from the object to the image side, a first movable negative lens group, a second movable positive lens group, a third stationary negative lens group and a fourth movable positive lens group with a first to third variable air spaces formed therebetween, respectively. And, the zoom lens system functions as an inverted telephoto type lens system in the shorter focal length range of the whole lens system by means of a combination of only the first lens group as a front negative group and the whole of the second to fourth lens groups as a rear positive group, while the zoom lens system functions as a telephoto type lens system in the longer focal length range of the whole lens system by means of a combination of the whole of the first and second lens groups as a front positive group and the whole of the third and fourth lens groups as a rear negative group. By this feature, the total length of thew hole lens system at the longer focal length side is reduced in comparison with the conventional two-group zoom lens ssytem. The above functions are achieved by reducing the first and third variable air spaces and increasing the second variable air space in accordance with the increase of the focal length of the whole lens system by means of axial movements of the first, second and fourth lens groups with the third lens group left stationary during zooming. The present invention is further characterized by the first lens group including a negative lens at its object side end. This feature is greatly effective to the desired compactness of the lens system.

According to another feature of the present invention, the lens system fulfills the following condition:

$$0.5 < R/|f_1| < 1.3$$

wherein, R represents a radius of curvature of the object side one of a pair of refractive surface defining the first air space numbered from the object side in the first lens group, and $f_1$ represents the focal length of the first lens group.

The features of the present invention which are believed to be novel are set forth with particularity in the appended claims. The present invention, both as to its organization and manner of operatior, together with further objects and advantages thereof, may best be understood by reference to the following description, taken in conjunction with the accompanying drawings.

BRIEF DESCRIPTION OF THE DRAWINGS

FIGS. 11a to 11c represent the aberration curves of the second embodiment for the longest focal length;

FIGS. 12a to 12c represent the aberration curves of the second embodiment for a medium focal length;

FIGS. 13a to 13c represent the aberration curves of the second embodiment for the shortest focal length;

FIGS. 20a to 20c represent the aberration curves of the fifth embodiment for the longest focal length;

FIGS. 21a to 21c represent the aberration curves of the fifth embodiment for the shortest focal length;

FIGS. 22a to 22c represent the aberration curves of the fifth embodiment for the shortest focal length;

DETAILED DESCRIPTION OF THE PREFERRED EMBODIMENTS

Figure 1:
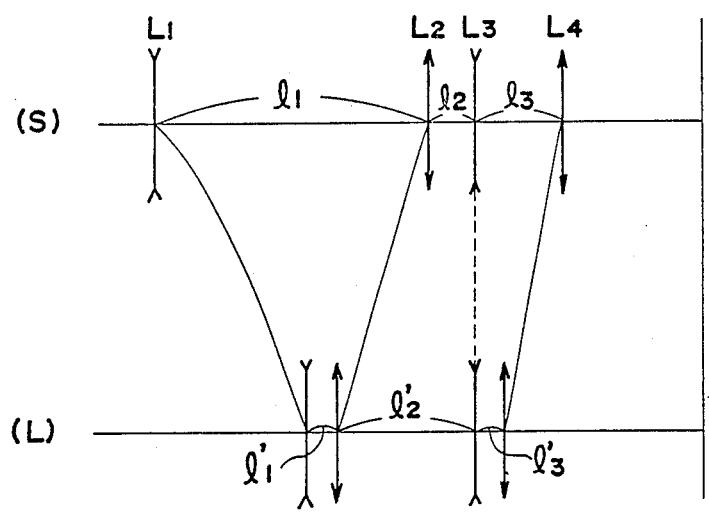
FIG. 1 represents a schematic view for showing the lens group movements in the lens system according to the present invention between the shortest and longest focal lengths.
Figure 2:
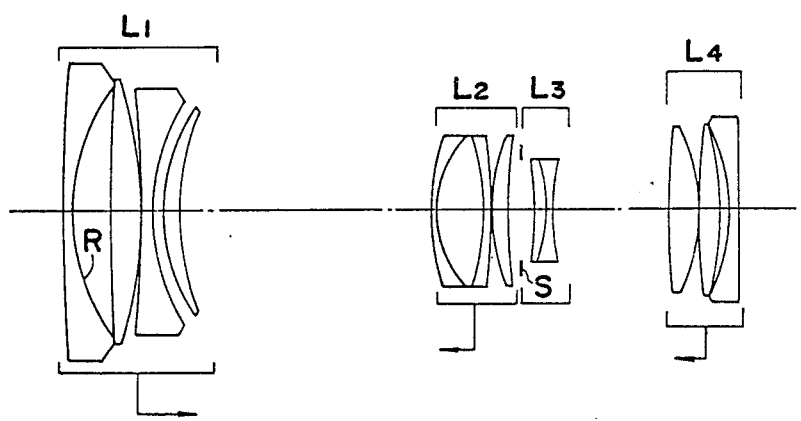
FIG. 2 represents a cross sectional view of the lens system according to a first embodiment of the present invention for the shortest focal length.
Figure 3:
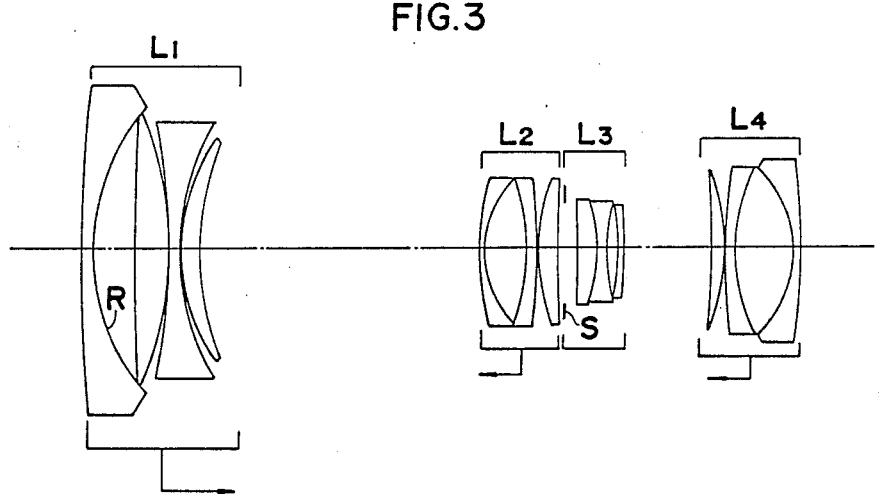
FIG. 3 represents a cross sectional view of the lens system according to a second embodiment of the present invention for the shortest focal length.
Figure 4:
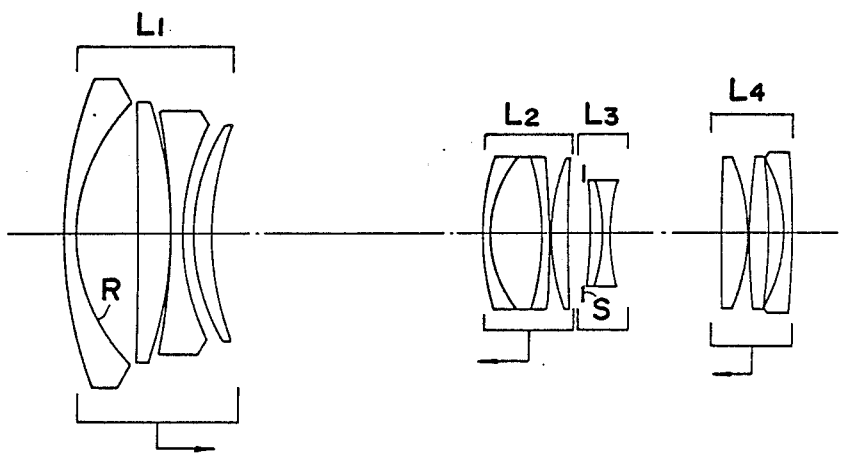
FIG. 4 represents a cross sectional view of the lens system according to a third embodiment of the present invention for the shortest focal length.
Figure 5:
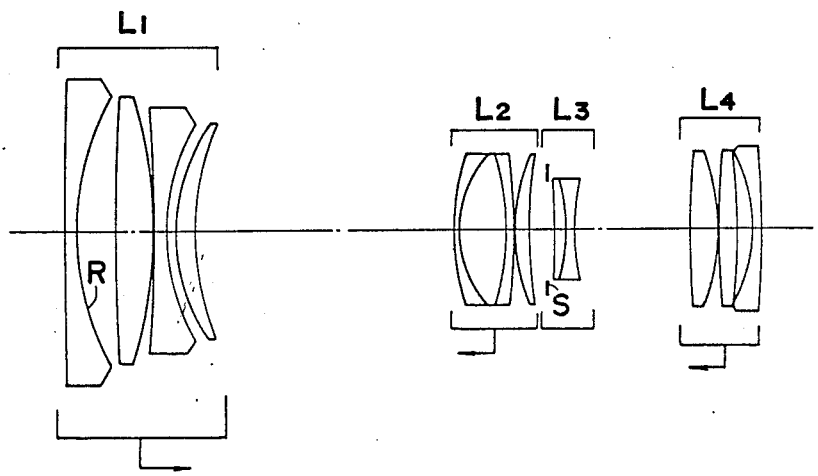
FIG. 5 represents a cross sectional view of the lens system according to a fourth embodiment of the present invention for the shortest focal length.
Figure 6:
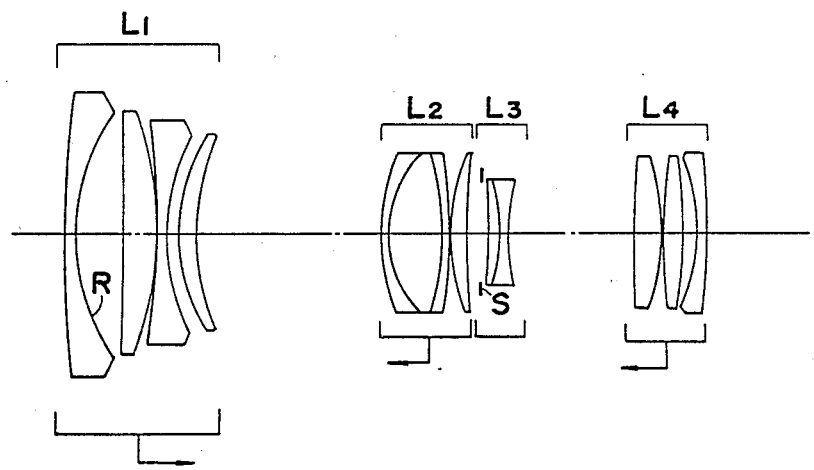
FIG. 6 represents a cross sectional view of the lens system according to a fifth embodiment of the present invention for the shortest focal length.
Figure 7:
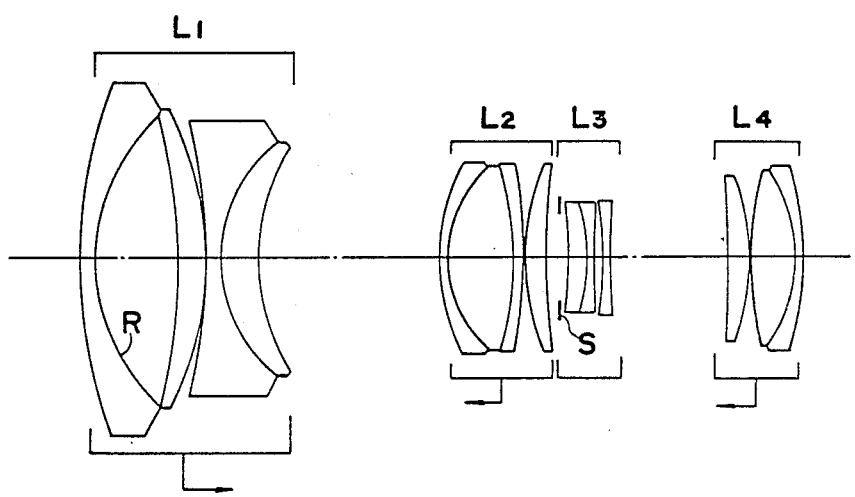
FIG. 7 represents a cross sectional view of the lens system according to a sixth embodiment of the present invention for the shortest forcal length.
Figure 8A:
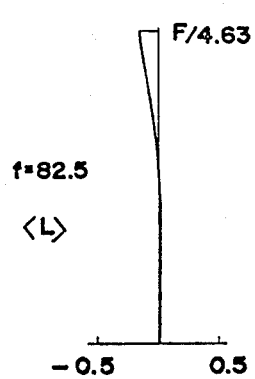
FIGS. 8a to 8c represent the aberration curves of the first embodiment for the longest focal length.
Figure 8B:
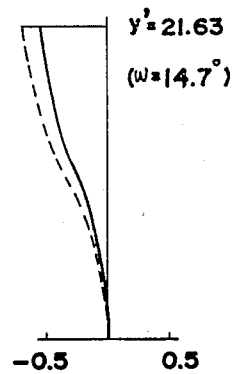
Figure 8C:
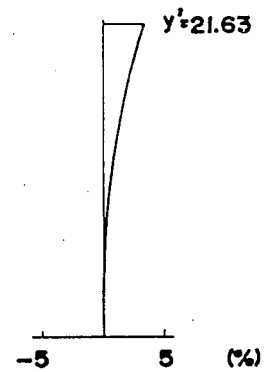
Figure 9A:
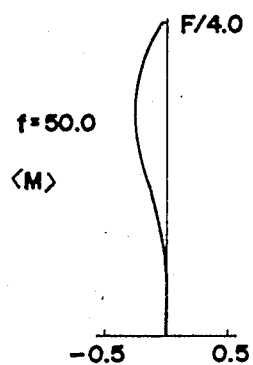
FIGS. 9a to 9c represent the aberration curves of the first embodiment for a medium focal length.
Figure 9B:
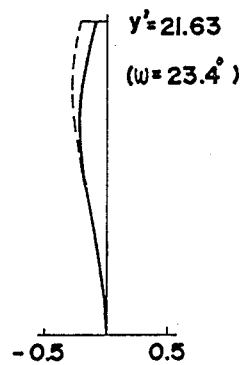
Figure 9C:
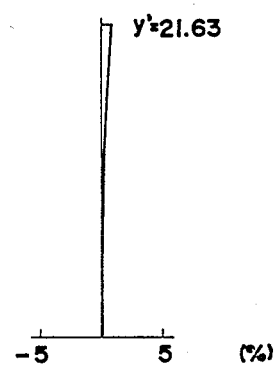
Figure 10A:
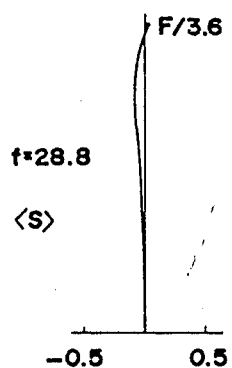
FIGS. 10a to 10c represent the aberration curves of the first embodiment for the shortest focal length.
Figure 10B:
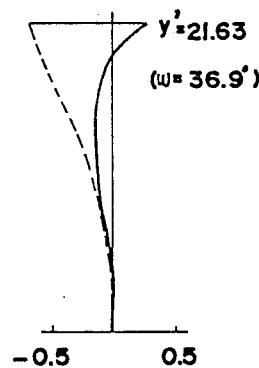
Figure 10C:
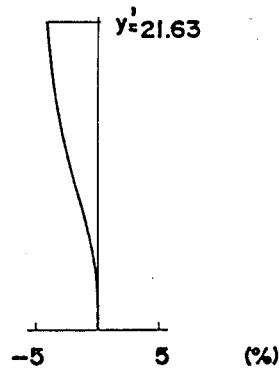
Figure 14A:
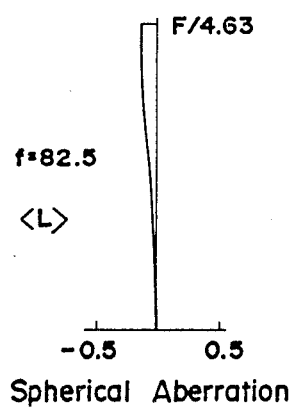
FIGS. 14a to 14c represent the aberration curves of the third embodiment for the longest focal length.
Figure 14B:
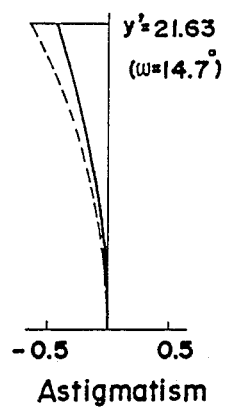
Figure 14C:
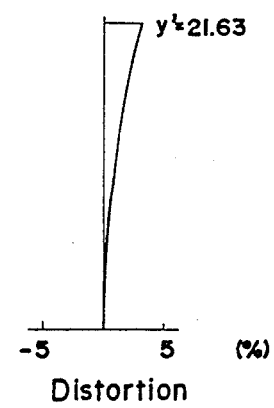
Figure 15A:
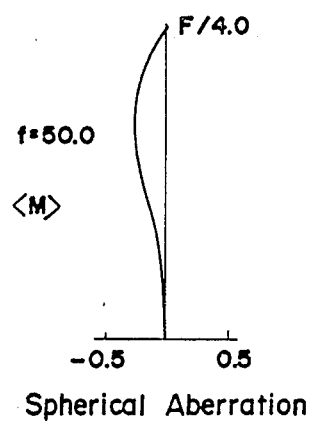
FIGS. 15a to 15c represent the aberration curves of the third embodiment for a medium focal length.
Figure 15B:
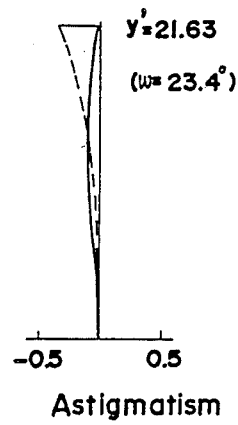
Figure 15C:
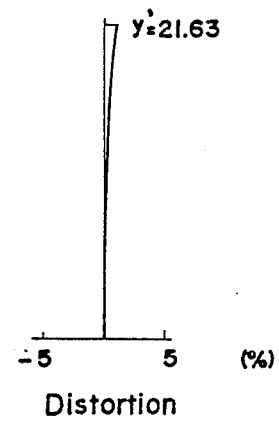
Figure 16A:
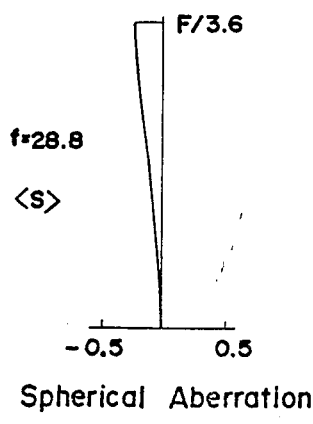
FIGS. 16a to 16c represent the aberration curves of the third embodiment for the shortest focal length.
Figure 16B:
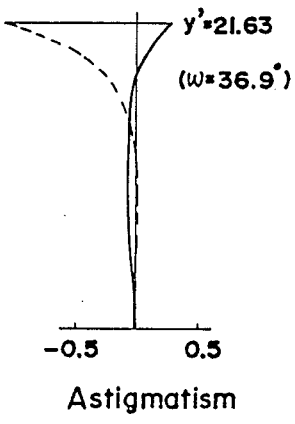
Figure 16C:
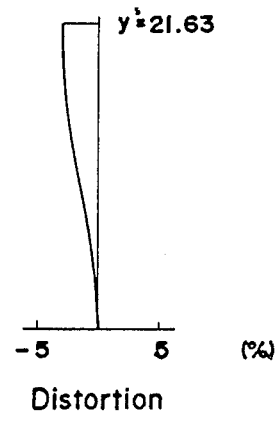
Figure 17A:
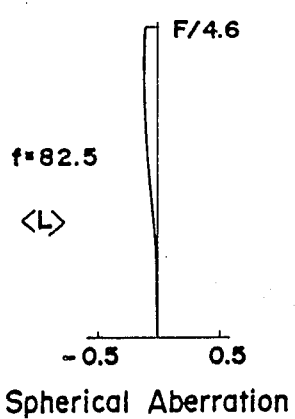
FIGS. 17a to 17c represent the aberration curves of the fourth embodiment for the longest focal length.
Figure 17B:
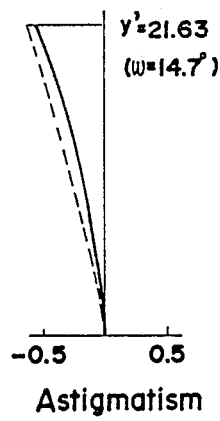
Figure 17C:
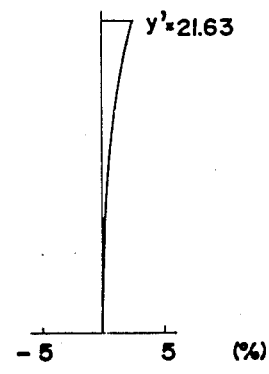
Figure 18A:
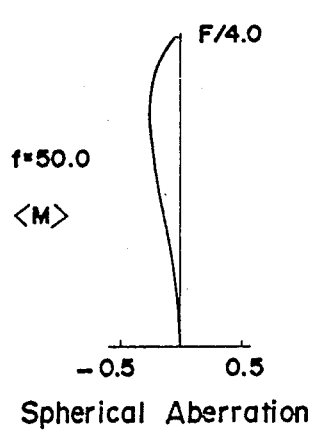
FIGS. 18a to 18c represent the aberration curves of the fourth embodiment for a medium focal length.
Figure 18B:
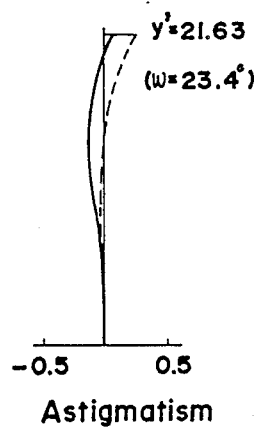
Figure 18C:
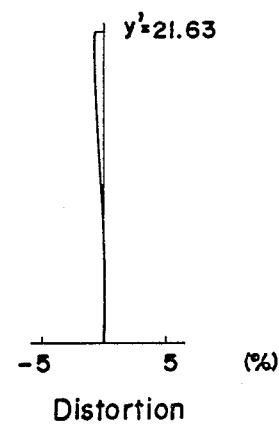
Figure 19A:
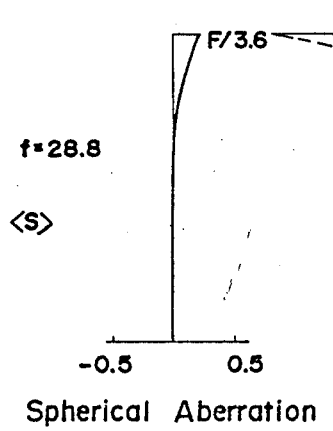
FIGS. 19a to 19c represent the aberration curves of the fourth embodiment for the shortest focal length.
Figure 19B:
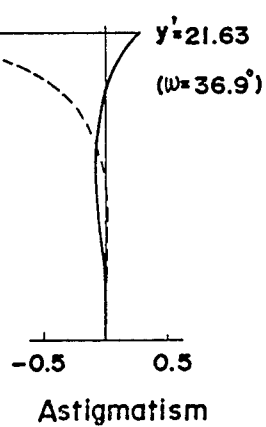
Figure 19C:
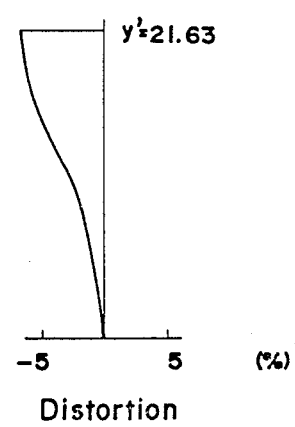
Figure 23A:
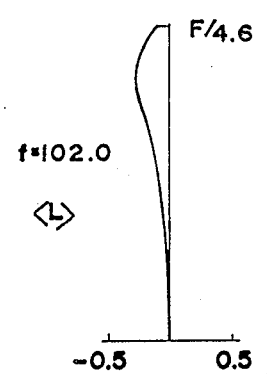
FIGS. 23a to 23c represent the aberration curves of the sixth embodiment for the longest focal length.
Figure 23B:
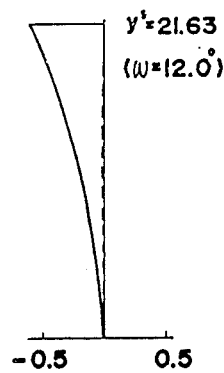
Figure 23C:
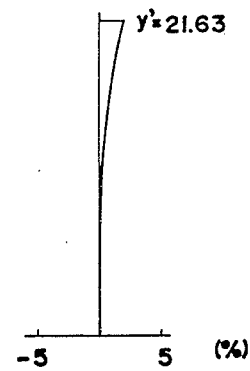
Figure 24A:
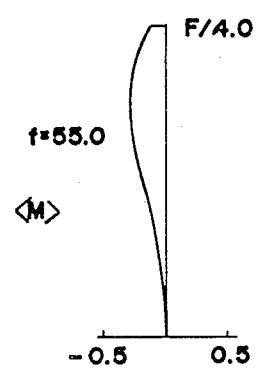
FIGS. 24a to 24c represent the aberration curves of the sixth embodiment for a medium focal length.
Figure 24B:
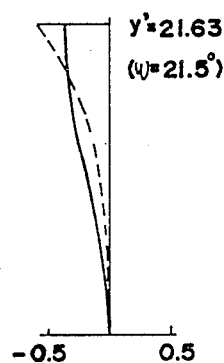
Figure 24C:
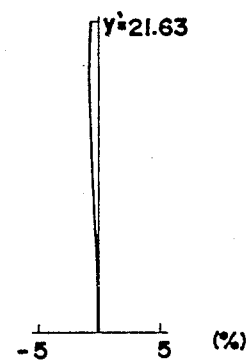
Figure 25A:
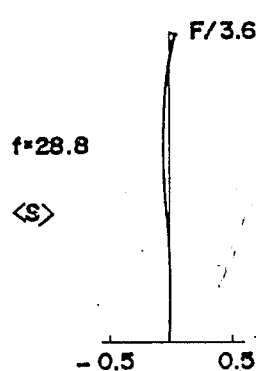
FIGS. 25a to 25c represent the aberration curves of the sixth embodiment for the shortest focal length.
Figure 25B:
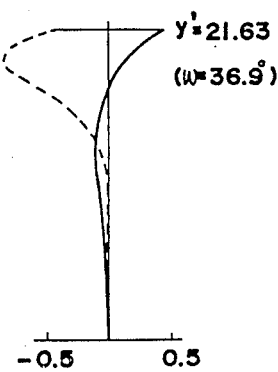
Figure 25C:
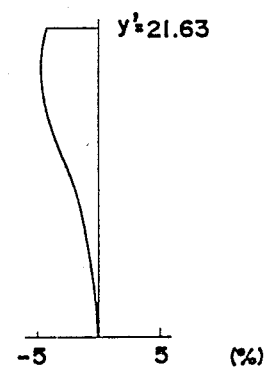

The following description is provided to enable any person skilled in the optical and camera field to make and use the invention and sets forth the best modes contemplated by the inventor for carrying-out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens groups and lens elements for the shortest focal length with arrows below the lens groups representing the directions of their movements for zooming toward the longest focal length. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

As disclosed in FIGS. 1 to 7, the present invention provides a zoom lens system of a relatively high zoom ratio ranging to a considerably wide field angel, comprising a first lens group ($L_1$) of a negative refractive power including a negative lens at its object side end, a second lens group ($L_2$) of a positive refractive power located on the image side of the first lens group ($L_1$) with a first variable air space ($l_1$), a third lens group ($L_3$) of a negative refractive power located on the image side of the second lens group ($L_2$) with a second variable air space ($l_2$), and a fourth lens group ($L_4$) of a positive refractive power located on the image side of the third lens group ($L_3$) with a third variable air space ($l_3$), wherein the first and third variable air spaces ($l_1$ and $l_3$) are reduced and the second variable air space ($l_2$) is increased in accordance with the increase of the focal length of the whole lens system by means of the axial movements of the first, second and fourth lens groups($L_1$, $L_2$ and $L_4$) with the third lens group ($L_3$) left stationary during the zooming.

The lens system according to the present invention fulfills the following condition:

$$0.5 < R/|f_1| < 1.3 \qquad (1)$$

wherein, R represents a radius of curvature of the object side one of a pair of refractive surfaces defining the first air space numbered from the object side in the first lens group ($L_1$), and $f_1$ represents the focal length of the first lens group ($L_1$).

As is understood from the above description, the present invention is characterized by the front negative lens in the first lens group ($L_1$). In the zoom lens system of a high zoom ratio, the increased diameter of the first lens group is generally a problem to be solved. The first lens group ($L_1$) with such a front negative lens in accordance with the present invention is remarkably effective to reduce the diameter of first lens group in comparison with a first lens group having a positive lens at the object side end thereof. This makes the whole lens system compact. The front negative lens in the first lens group of the present invention can be a doublet if necessary.

Further, in accordance with the present invention, the third lens group ($L_3$) is left stationary upon zooming. This feature effectively simplifies the lens barrel mechanism since the number of zoom cams for controlling the lens groups movements is reduced. In a zoom system having four lens groups as in the present invention, it is generally recommended to locate the diaphragm aperture stop(s) at the third lens group ($L_3$). In this circumstance, the feature of the present invention that the third lens group($L_3$) is stationary renders the diaphragm aperture stop(s) also stationary with respect to the direction along the optical axis. This simplifies a mechanism necessary to adjust the diaphragm aperture stop(s).

The above mentioned condition(1) relates to the radius of curvature of the object side one of a pair of refractive surfaces defining the first air space numbered from the object side, i.e. the image side surface of the negative lens located at the object side end of the first lens group($L_1$). If the lower limit of condition(1) is violated, coma would be greatly generated in the zonal to marginal area upon zooming in the medium to longest focal length, such coma being difficult to be sufficiently corrected. On the contrary, if the upper limit of condition(1) is violated, it would be difficult to balance the correction of the spherical aberration with the deterioration of the correction for coma and distortion avoided.

FIG. 1 is for explaining the lens group movements of the lens system according to the present invention in more detail, in which the solid lines between the shortest focal length arrangement(s) and the longest focal length arrangement (L) respectively represent the movements of the first lens group($L_1$), the second lens group($L_2$) and the fourth lens group($L_4$), while the broken line represents that the third lens group($L_3$) is left stationary upon zooming. Referring to FIG. 1, the lens system fulfills the following conditions:

$l_1 > l_1'$
$l_2 < l_2'$
$l_3 > l_3'$ wherein $l_1$, $l_2$ and $l_3$ represent the first to third variable air spaces for the shortest focal length (S), respectively, while $l_1'$, $l_2'$ and $l_3'$ represent the first to third variable air spaces for the longest focal length (L), respectively. The condition, $l_1 > l_1'$ is necessary for realizing an inverted telephoto type in the shorter focal length side (S), while the condition, $l_2 > l_2'$ for realizing a telephoto type in the longer focal length side (L). For the purpose of realizing a telephoto type in the longer focal length arrangement (L), it is further necessary to make the total focal length of the first and second lens groups positive, and the total focal length of the third and fourth lens groups negative. This is summarized by the following conditions:

$$f_2 < |f_1| \quad (2)$$

$$|f_3| < f_4 \quad (3)$$

wherein $f_1$, $f_2$, $f_3$ and $f_4$ represent the focal lengths of the first to fourth lens groups, respectively.

According to the present invention it is further recommended to fulfill the following conditions:

$$0.9 < f_2/f_w < 1.5 \quad (4)$$

$$0.8 < |f_3|/f_w > 1.6 \quad (5)$$

$$0.5 < |f_1|/\sqrt{f_w \cdot f_t} < 1.2 \quad (6)$$

wherein, $f_w$ and $f_t$ represent the shortest and longest focal lengths of the whole lens system, respectively.

Conditions (4) and (5) are both for achieving a desired aberration correction all over the entire zoom range with the movement of the third lens group ($L_3$) avoided. If the lower limit of conditions (4) is violated, the refractive power of the second lens group ($L_2$) would be excessively increased, which makes it difficult to correct the spherical aberration and astigmatism although the excessive refractive power of the second lens group ($L_2$) may be rather favorable to the compactness of the system. To correct such spherical aberration and astigmatism, it would be inevitable to move the third lens group ($L_3$). On the contrary, if the upper limit of condition (4) is violated, the refractive power of the second lens group ($L_2$) would be excessively decreased to make the lens system bulky both in its total length and diameter, although the aberration correction would be easy.

On the other hand, an excessively great refractive power of the third lens group ($L_3$) violating the lower limit of condition (5) would make it difficult to correct distortion and coma throughout the entire zoom range. In contrast thereto, if the upper limit of condition (5) is violated, the refractive power of the third lens group ($L_3$) would be excessively decreased, which also reduces the refractive power of the fourth lens group ($L_4$) in relation with the above mentioned conditions (2) and (3). This is unfavorable to the telephoto-type desired in the longer focal length side, which leads to a bulkiness of the lens system.

Condition (6) defines the focal length of the first lens group ($L_1$) so as to balance the optical performance of the lens system throughout the entire zoom range. If the lower limit of condition (6) is violated, it would be difficult to correct spherical aberration and astigmatism in the longer focal length side. Or, the total length of the whole lens system would be increased both at the shortest and longest focal lengths if the upper limit of condition (6) is violated.

The following Tables 1 to 6 disclose, respectively, the first through sixth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lens elements along the optical axis, N equals the refractive index and again, the sub numbers refer to the particular optical element from the object to image side, and finally, $\nu$ equals the Abbe number and the sub numbers refer to the specific lens elements from the object to image side. The F-number and the variable air space distances in the Tables provided with three separate values correspond to the values for the shortest, medium and longest focal lengths, respectively.

TABLE 1

[Embodiment 1]
$f = 28.8 \sim 50.0 \sim 82.5$  $F_{No.} = 3.6 \sim 4.0 \sim 4.63$

| | Radius of Curvature | | Axial Distance | Refractive Index ($N_d$) | | Abbe Number ($\nu_d$) |
|---|---|---|---|---|---|---|
| $L_1$ | $r_1$ | 333.333 | | | | |
| | | | $d_1$ 1.70 | $N_1$ 1.7725 | $\nu_1$ | 49.8 |
| | $r_2$ | 37.379 | | | | |
| | | | $d_2$ 6.00 | | | |
| | $r_3$ | 374.702 | | | | |
| | | | $d_3$ 5.00 | $N_2$ 1.80741 | $\nu_2$ | 31.6 |
| | $r_4$ | −68.960 | | | | |
| | | | $d_4$ 0.12 | | | |
| | $r_5$ | −175.441 | | | | |
| | | | $d_5$ 1.60 | $N_3$ 1.7725 | $\nu_3$ | 49.8 |
| | $r_6$ | 35.419 | | | | |
| | | | $d_6$ 1.80 | | | |
| | $r_7$ | 30.978 | | | | |
| | | | $d_7$ 2.70 | $N_4$ 1.84666 | $\nu_4$ | 23.9 |
| | $r_8$ | 42.047 | | | | |
| | | | $d_8$ 41.48 ∼ 14.19 ∼ 0.80 | | | |
| $L_2$ | $r_9$ | 36.673 | | | | |
| | | | $d_9$ 1.10 | $N_5$ 1.834 | $\nu_5$ | 37.1 |
| | $r_{10}$ | 18.006 | | | | |
| | | | $d_{10}$ 7.80 | $N_6$ 1.6968 | $\nu_6$ | 56.5 |
| | $r_{11}$ | −35.528 | | | | |
| | | | $d_{11}$ 1.10 | $N_7$ 1.75 | $\nu_7$ | 25.1 |
| | $r_{12}$ | −104.959 | | | | |
| | | | $d_{12}$ 0.12 | | | |
| | $r_{13}$ | 31.099 | | | | |

TABLE 1-continued

[Embodiment 1]
$f = 28.8 \sim 50.0 \sim 82.5 \quad F_{No.} = 3.6 \sim 4.0 \sim 4.63$

| | Radius of Curvature | Axial Distance | Refractive Index ($N_d$) | | Abbe Number ($\nu_d$) | |
|---|---|---|---|---|---|---|
| | | $d_{13}$ 2.60 | $N_8$ 1.618 | | $\nu_8$ | 63.5 |
| | $r_{14}$ 88.117 | | | | | |
| | | $d_{14}$ 4.20 ~ 11.57 ~ 21.55 | | | | |
| | $r_{15}$ −102.718 | | | | | |
| | | $d_{15}$ 2.20 | $N_9$ 1.80518 | | $\nu_9$ | 25.4 |
| $L_3$ | $r_{16}$ −26.126 | | | | | |
| | | $d_{16}$ 1.00 | $N_{10}$ 1.7425 | | $\nu_{10}$ | 52.5 |
| | $r_{17}$ 37.626 | | | | | |
| | | $d_{17}$ 18.85 ~ 11.49 ~ 1.50 | | | | |
| | $r_{18}$ 116.519 | | | | | |
| | | $d_{18}$ 5.00 | $N_{11}$ 1.6405 | | $\nu_{11}$ | 60.1 |
| | $r_{19}$ −31.574 | | | | | |
| | | $d_{19}$ 0.12 | | | | |
| | $r_{20}$ 134.730 | | | | | |
| $L_4$ | | $d_{20}$ 3.2 | $N_{12}$ 1.67 | | $\nu_{12}$ | 57.1 |
| | $r_{21}$ −64.837 | | | | | |
| | | $d_{21}$ 2.0 | | | | |
| | $r_{22}$ −27.714 | | | | | |
| | | $d_{22}$ 1.40 | $N_{13}$ 1.7569 | | $\nu_{13}$ | 31.8 |
| | $r_{23}$ −831.721 | | | | | |

$f_1 = -41.667, f_2 = 30.853, f_3 = -39.370, f_4 = 56.840$

TABLE 2

[Embodiment 2]
$f = 28.8 \sim 50.0 \sim 82.5 \quad F_{No.} = 3.6 \sim 4.0 \sim 4.63$

| | Radius of Curvature | Axial Distance | Refractive Index ($N_d$) | Abbe Number ($\nu_d$) |
|---|---|---|---|---|
| | $r_1$ 250.000 | | | |
| | | $d_1$ 1.70 | $N_1$ 1.6968 | $\nu_1$ 55.4 |
| | $r_2$ 33.933 | | | |
| | | $d_2$ 7.00 | | |
| | $r_3$ 502.974 | | | |
| | | $d_3$ 5.50 | $N_2$ 1.7106 | $\nu_2$ 43.3 |
| $L_1$ | $r_4$ −59.941 | | | |
| | | $d_4$ 0.10 | | |
| | $r_5$ −93.188 | | | |
| | | $d_5$ 1.50 | $N_3$ 1.6968 | $\nu_3$ 55.4 |
| | $r_6$ 39.682 | | | |
| | | $d_6$ 0.10 | | |
| | $r_7$ 31.455 | | | |
| | | $d_7$ 3.30 | $N_4$ 1.80518 | $\nu_4$ 25.4 |
| | $r_8$ 46.417 | | | |
| | | $d_8$ 46.00 ~ 16.08 ~ 1.20 | | |
| | $r_9$ 41.504 | | | |
| | | $d_9$ 1.00 | $N_5$ 1.8075 | $\nu_5$ 35.5 |
| | $r_{10}$ 17.645 | | | |
| | | $d_{10}$ 7.00 | $N_6$ 1.72 | $\nu_6$ 50.3 |
| | $r_{11}$ −30.307 | | | |
| $L_2$ | | $d_{11}$ 1.50 | $N_7$ 1.80518 | $\nu_7$ 25.4 |
| | $r_{12}$ −88.826 | | | |
| | | $d_{12}$ 0.15 | | |
| | $r_{13}$ 31.188 | | | |
| | | $d_{13}$ 3.00 | $N_8$ 1.64 | $\nu_8$ 60.2 |
| | $r_{14}$ 120.353 | | | |
| | | $d_{14}$ 3.70 ~ 9.33 ~ 16.73 | | |
| | $r_{15}$ −121.072 | | | |
| | | $d_{15}$ 3.50 | $N_9$ 1.84666 | $\nu_9$ 23.9 |
| | $r_{16}$ −21.648 | | | |
| | | $d_{16}$ 1.30 | $N_{10}$ 1.7725 | $\nu_{10}$ 49.8 |
| $L_3$ | $r_{17}$ 30.431 | | | |
| | | $d_{17}$ 2.00 | | |
| | $r_{18}$ −37.636 | | | |
| | | $d_{18}$ 1.00 | $N_{11}$ 1.7725 | $\nu_{11}$ 49.8 |
| | $r_{19}$ −59.214 | | | |
| | | $d_{19}$ 13.73 ~ 8.10 ~ 0.70 | | |
| | $r_{20}$ −205.345 | | | |
| | | $d_{20}$ 2.50 | $N_{12}$ 1.7725 | $\nu_{12}$ 49.8 |
| | $r_{21}$ −34.240 | | | |
| | | $d_{21}$ 0.10 | | |
| | $r_{22}$ 147.228 | | | |
| $L_4$ | | $d_{22}$ 1.30 | $N_{13}$ 1.65446 | $\nu_{13}$ 33.9 |
| | $r_{23}$ 26.877 | | | |
| | | $d_{23}$ 10.00 | $N_{14}$ 1.6583 | $\nu_{14}$ 58.5 |
| | $r_{24}$ −18.696 | | | |
| | | $d_{24}$ 1.20 | $N_{15}$ 1.805 | $\nu_{15}$ 41.0 |

TABLE 2-continued

[Embodiment 2]
$f = 28.8 \sim 50.0 \sim 82.5 \quad F_{No.} = 3.6 \sim 4.0 \sim 4.63$

| Radius of Curvature | Axial Distance | Refractive Index ($N_d$) | Abbe Number ($\nu_d$) |
|---|---|---|---|
| $r_{25}$ −118.697 | | | |

$f_1 = -45.455, f_2 = 28.902, f_3 = -27.051, f_4 = 44.352$

TABLE 3

[Embodiment 3]
$f = 28.8 \sim 50.0 \sim 82.5 \quad F_{No.} = 3.6 \sim 4.0 \sim 4.63$

| | Radius of Curvature | Axial Distance | Refractive Index ($N_d$) | Abbe Number ($\nu_d$) |
|---|---|---|---|---|
| | $r_1$ 69.842 | | | |
| | | $d_1$ 1.70 | $N_1$ 1.7725 | $\nu_1$ 49.8 |
| | $r_2$ 30.030 | | | |
| | | $d_2$ 10.00 | | |
| | $r_3$ −3969.87 | | | |
| | | $d_3$ 5.40 | $N_2$ 1.80741 | $\nu_2$ 31.6 |
| | $r_4$ −67.672 | | | |
| $L_1$ | | $d_4$ 0.12 | | |
| | $r_5$ −93.265 | | | |
| | | $d_5$ 1.60 | $N_3$ 1.7725 | $\nu_3$ 49.8 |
| | $r_6$ 40.451 | | | |
| | | $d_6$ 1.80 | | |
| | $r_7$ 33.126 | | | |
| | | $d_7$ 3.00 | $N_4$ 1.84666 | $\nu_4$ 23.9 |
| | $r_8$ 46.216 | | | |
| | | $d_8$ 44.34 ~ 15.27 ~ 0.80 | | |
| | $r_9$ 41.075 | | | |
| | | $d_9$ 1.10 | $N_5$ 1.834 | $\nu_5$ 37.1 |
| | $r_{10}$ 18.877 | | | |
| | | $d_{10}$ 8.80 | $N_6$ 1.6968 | $\nu_6$ 56.5 |
| | $r_{11}$ −37.861 | | | |
| $L_2$ | | $d_{11}$ 1.10 | $N_7$ 1.75 | $\nu_7$ 25.1 |
| | $r_{12}$ −97.066 | | | |
| | | $d_{12}$ 0.12 | | |
| | $r_{13}$ 33.450 | | | |
| | | $d_{13}$ 2.70 | $N_8$ 1.618 | $\nu_8$ 63.5 |
| | $r_{14}$ 151.381 | | | |
| | | $d_{14}$ 3.90 ~ 11.01 ~ 20.72 | | |
| | $r_{15}$ −90.071 | | | |
| | | $d_{15}$ 2.20 | $N_9$ 1.80518 | $\nu_9$ 25.4 |
| $L_3$ | $r_{16}$ −25.171 | | | |
| | | $d_{16}$ 1.00 | $N_{10}$ 1.7495 | $\nu_{10}$ 50.0 |
| | $r_{17}$ 39.435 | | | |
| | | $d_{17}$ ~ 18.32 ~ 11.21 ~ 1.50 | | |
| | $r_{18}$ −2221.97 | | | |
| | | $d_{18}$ 4.50 | $N_{11}$ 1.671 | $\nu_{11}$ 51.7 |
| | $r_{19}$ −27.619 | | | |
| | | $d_{19}$ 0.12 | | |
| | $r_{20}$ 188.554 | | | |
| $L_4$ | | $d_{20}$ 3.20 | $N_{12}$ 1.67 | $\nu_{12}$ 57.1 |
| | $r_{21}$ −70.944 | | | |
| | | $d_{21}$ 2.30 | | |
| | $r_{22}$ −26.428 | | | |
| | | $d_{22}$ 1.40 | $N_{13}$ 1.7552 | $\nu_{13}$ 27.5 |
| | $r_{23}$ −133.035 | | | |

$f_1 = -41.667, f_2 = 31.034, f_3 = -38.478, f_4 = 59.847$

TABLE 4

[Embodiment 4]
$f = 28.8 \sim 50.0 \sim 82.5 \quad F_{No.} = 3.6 \sim 4.0 \sim 4.6$

| | Radius of Curvature | Axial Distance | Refractive Index ($N_d$) | Abbe Number ($\nu_d$) |
|---|---|---|---|---|
| | $r_1$ ∞ | | | |
| | | $d_1$ 1.70 | $N_1$ 1.7725 | $\nu_1$ 49.8 |
| | $r_2$ 46.512 | | | |
| | | $d_2$ 6.20 | | |
| | $r_3$ 419.342 | | | |
| | | $d_3$ 6.22 | $N_2$ 1.80741 | $\nu_2$ 31.6 |
| | $r_4$ −74.038 | | | |
| $L_1$ | | $d_4$ 0.12 | | |
| | $r_5$ −216.486 | | | |
| | | $d_5$ 1.60 | $N_3$ 1.7725 | $\nu_3$ 49.8 |
| | $r_6$ 33.619 | | | |
| | | $d_6$ 1.80 | | |

TABLE 4-continued

[Embodiment 4]
$f = 28.8 \sim 50.0 \sim 82.5 \; F_{No.} = 3.6 \sim 4.0 \sim 4.6$

| | | Radius of Curvature | Axial Distance | Refractive Index ($N_d$) | | Abbe Number ($\nu_d$) |
|---|---|---|---|---|---|---|
| | $r_7$ | 31.816 | | | | |
| | | | $d_7$ 3.00 | $N_4$ 1.84666 | $\nu_4$ | 23.9 |
| | $r_8$ | 43.525 | | | | |
| | | | $d_8$ 42.42 ~ 14.56 ~ 0.80 | | | |
| | $r_9$ | 36.866 | | | | |
| | | | $d_9$ 1.10 | $N_5$ 1.834 | $\nu_5$ | 37.1 |
| | $r_{10}$ | 18.475 | | | | |
| | | | $d_{10}$ 7.80 | $N_6$ 1.6968 | $\nu_6$ | 56.5 |
| | $r_{11}$ | −35.926 | | | | |
| $L_2$ | | | $d_{11}$ 1.10 | $N_7$ 1.75 | $\nu_7$ | 25.1 |
| | $r_{12}$ | −105.234 | | | | |
| | | | $d_{12}$ 0.12 | | | |
| | $r_{13}$ | 30.137 | | | | |
| | | | $d_{13}$ 2.60 | $N_8$ 1.618 | $\nu_8$ | 63.5 |
| | $r_{14}$ | 82.003 | | | | |
| | | | $d_{14}$ 4.20 ~ 11.51 ~ 21.48 | | | |
| | $r_{15}$ | −110.161 | | | | |
| | | | $d_{15}$ 2.20 | $N_9$ 1.80518 | $\nu_9$ | 25.4 |
| $L_3$ | $r_{16}$ | −25.752 | | | | |
| | | | $d_{16}$ 1.00 | $N_{10}$ 1.7495 | $\nu_{10}$ | 50.0 |
| | $r_{17}$ | 37.690 | | | | |
| | | | $d_{17}$ 18.78 ~ 11.47 ~ 1.50 | | | |
| | $r_{18}$ | 140.406 | | | | |
| | | | $d_{18}$ 4.80 | $N_{11}$ 1.671 | $\nu_{11}$ | 51.7 |
| | $r_{19}$ | −33.731 | | | | |
| | | | $d_{19}$ 0.12 | | | |
| | $r_{20}$ | 198.465 | | | | |
| $L_4$ | | | $d_{20}$ 3.20 | $N_{12}$ 1.67 | $\nu_{12}$ | 57.1 |
| | $r_{21}$ | −73.957 | | | | |
| | | | $d_{21}$ 2.31 | | | |
| | $r_{22}$ | −27.272 | | | | |
| | | | $d_{22}$ 1.40 | $N_{13}$ 1.7552 | $\nu_{13}$ | 27.5 |
| | $r_{23}$ | −147.561 | | | | |

$f_1 = -41.667, f_2 = 30.660, f_3 = -39.606, f_4 = 58.908$

TABLE 5

[Embodiment 5]
$f = 28.8 \sim 50.0 \sim 82.5 \; F_{No.} = 3.6 \sim 4.0 \sim 4.6$

| | | Radius of Curvature | Axial Distance | Refractive Index ($N_d$) | | Abbe Number ($\nu_d$) |
|---|---|---|---|---|---|---|
| | $r_1$ | 206.742 | | | | |
| | | | $d_1$ 1.70 | $N_1$ 1.7725 | $\nu_1$ | 49.8 |
| | $r_2$ | 34.144 | | | | |
| | | | $d_2$ 7.50 | | | |
| | $r_3$ | −2634.98 | | | | |
| | | | $d_3$ 5.40 | $N_2$ 1.80741 | $\nu_2$ | 31.6 |
| $L_1$ | $r_4$ | −59.791 | | | | |
| | | | $d_4$ 0.12 | | | |
| | $r_5$ | −130.332 | | | | |
| | | | $d_5$ 1.60 | $N_3$ 1.7725 | $\nu_3$ | 49.8 |
| | $r_6$ | 32.411 | | | | |
| | | | $d_6$ 1.80 | | | |
| | $r_7$ | 29.257 | | | | |
| | | | $d_7$ 3.00 | $N_4$ 1.84666 | $\nu_4$ | 23.9 |
| | $r_8$ | 38.534 | | | | |
| | | | $d_8$ 30.69 ~ 10.42 ~ 0.80 | | | |
| | $r_9$ | 34.366 | | | | |
| | | | $d_9$ 1.10 | $N_5$ 1.834 | $\nu_5$ | 37.1 |
| | $r_{10}$ | 17.178 | | | | |
| | | | $d_{10}$ 9.00 | $N_6$ 1.6968 | $\nu_6$ | 56.5 |
| | $r_{11}$ | −36.473 | | | | |
| $L_2$ | | | $d_{11}$ 1.10 | $N_7$ 1.75 | $\nu_7$ | 25.1 |
| | $r_{12}$ | −80.970 | | | | |
| | | | $d_{12}$ 0.12 | | | |
| | $r_{13}$ | 30.964 | | | | |
| | | | $d_{13}$ 2.6 | $N_8$ 1.618 | $\nu_8$ | 63.5 |
| | $r_{14}$ | 83.804 | | | | |
| | | | $d_{14}$ 3.9 ~ 12.29 ~ 23.19 | | | |
| | $r_{15}$ | −87.500 | | | | |
| | | | $d_{15}$ 2.20 | $N_9$ 1.80518 | $\nu_9$ | 25.4 |
| $L_3$ | $r_{16}$ | −25.041 | | | | |
| | | | $d_{16}$ 1.00 | $N_{10}$ 1.7495 | $\nu_{10}$ | 50.0 |
| | $r_{17}$ | 37.609 | | | | |
| | | | $d_{17}$ 20.79 ~ 12.40 ~ 1.50 | | | |
| | $r_{18}$ | 126.975 | | | | |

TABLE 5-continued

[Embodiment 5]
$f = 28.8 \sim 50.0 \sim 82.5 \; F_{No.} = 3.6 \sim 4.0 \sim 4.6$

| | | Radius of Curvature | Axial Distance | Refractive Index ($N_d$) | | Abbe Number ($\nu_d$) |
|---|---|---|---|---|---|---|
| | | | $d_{18}$ 4.80 | $N_{11}$ 1.61762 | $\nu_{11}$ | 52.7 |
| | $r_{19}$ | −32.310 | | | | |
| | | | $d_{19}$ 0.12 | | | |
| | $r_{20}$ | 131.990 | | | | |
| $L_4$ | | | $d_{20}$ 3.20 | $N_{12}$ 1.58913 | $\nu_{12}$ | 61.1 |
| | $r_{21}$ | −68.060 | | | | |
| | | | $d_{21}$ 2.35 | | | |
| | $r_{22}$ | −28.435 | | | | |
| | | | $d_{22}$ 1.40 | $N_{13}$ 1.80518 | $\nu_{13}$ | 25.4 |
| | $r_{23}$ | −103.243 | | | | |

$f_1 = -33.333, f_2 = 28.604, f_3 = -36.785, f_4 = 53.285$

TABLE 6

[Embodiment 6]
$f = 28.8 \sim 55.0 \sim 102.0 \; F_{No.} = 3.6 \sim 4.0 \sim 4.6$

| | | Radius of Curvature | Axial Distance | Refractive Index | | Abbe Number |
|---|---|---|---|---|---|---|
| | $r_1$ | 87.172 | | | | |
| | | | $d_1$ 2.20 | $N_1$ 1.7725 | $\nu_1$ | 49.8 |
| | $r_2$ | 31.737 | | | | |
| | | | $d_2$ 13.50 | | | |
| | $r_3$ | −97.886 | | | | |
| | | | $d_3$ 4.50 | $N_2$ 1.8075 | $\nu_2$ | 35.5 |
| $L_1$ | $r_4$ | −53.394 | | | | |
| | | | $d_4$ 0.12 | | | |
| | $r_5$ | −93.887 | | | | |
| | | | $d_5$ 2.0 | $N_3$ 1.5168 | $\nu_3$ | 64.1 |
| | $r_6$ | 22.883 | | | | |
| | | | $d_6$ 6.5 | $N_4$ 1.84666 | $\nu_4$ | 23.9 |
| | $r_7$ | 34.221 | | | | |
| | | | $d_7$ 29.49 ~ 9.91 ~ 0.80 | | | |
| | $r_8$ | 31.408 | | | | |
| | | | $d_8$ 1.50 | $N_5$ 1.84666 | $\nu_5$ | 23.9 |
| | $r_9$ | 19.904 | | | | |
| | | | $d_9$ 11.00 | $N_6$ 1.58913 | $\nu_6$ | 61.1 |
| | $r_{10}$ | −46.380 | | | | |
| $L_2$ | | | $d_{10}$ 1.50 | $N_7$ 1.84666 | $\nu_7$ | 23.9 |
| | $r_{11}$ | −87.558 | | | | |
| | | | $d_{11}$ 0.12 | | | |
| | $r_{12}$ | 37.710 | | | | |
| | | | $d_{12}$ 3.60 | $N_8$ 1.618 | $\nu_8$ | 63.5 |
| | $r_{13}$ | 111.660 | | | | |
| | | | $d_{13}$ 3.40 ~ 18.28 ~ 40.44 | | | |
| | $r_{14}$ | −125.384 | | | | |
| | | | $d_{14}$ 3.50 | $N_9$ 1.80518 | $\nu_9$ | 25.4 |
| | $r_{15}$ | −26.547 | | | | |
| | | | $d_{15}$ 1.10 | $N_{10}$ 1.7495 | $\nu_{10}$ | 50.0 |
| $L_3$ | $r_{16}$ | 286.185 | | | | |
| | | | $d_{16}$ 1.50 | | | |
| | $r_{17}$ | −49.005 | | | | |
| | | | $d_{17}$ 1.10 | $N_{11}$ 1.7725 | $\nu_{11}$ | 49.8 |
| | $r_{18}$ | 84.645 | | | | |
| | | | $d_{18}$ 19.00 ~ 10.20 ~ 1.00 | | | |
| | $r_{19}$ | −2177.90 | | | | |
| | | | $d_{19}$ 4.00 | $N_{12}$ 1.5168 | $\nu_{12}$ | 64.1 |
| | $r_{20}$ | −33.967 | | | | |
| | | | $d_{20}$ 0.12 | | | |
| $L_4$ | $r_{21}$ | 62.142 | | | | |
| | | | $d_{21}$ 7.00 | $N_{13}$ 1.5168 | $\nu_{13}$ | 64.1 |
| | $r_{22}$ | −25.886 | | | | |
| | | | $d_{22}$ 1.40 | $N_{14}$ 1.85026 | $\nu_{14}$ | 32.3 |
| | $r_{23}$ | −52.697 | | | | |

$f_1 = -40.000, f_2 = 36.131, f_3 = -30.661, f_4 = 38.389$

In the embodiments, it should be noted that the first lens group ($L_1$) includes at least two positive lens elements on the image side of the front negative lens. Further, it is recommendable that the first lens group ($L_1$) further includes at least one negative lens element between the two positive lens elements as in the embodiments. The image side one of the two positive lens elements may be cemented to the negative lens element as in the sixth embodiment.

Further, in the embodiments, the second lens group ($L_2$) includes an object side positive lens consisting of a biconvex lens elements and a pair of negative meniscus lens elements with different refractive index and Abbe number cemented on both sides of the biconvex lens element, respectively, and an image side positive single lens element. This construction is effective to correct aberrations of the second lens group ($L_2$) by itself, which is favorable to correct spherical aberration and chromatic aberration throughout the entire zoom range. Such a construction for the second lens group ($L_2$) is also advantageous in comparison with a second lens group composed of the same number of lens elements consisting of two doublets in view of the reduced axial length of the second lens group ($L_2$) and the illumination for the marginal area of the image. However, the second lens group ($L_2$) can be alternatively constructed by an object side doublet and an image side singlet with the number of necessary lens elements for the second lens group reduced by one, and such a construction is generally within the scope of the present invention. In this alternative construction of the second lens group ($L_2$), the relatively insufficient aberration correction within the second lens group ($L_2$) should be corrected by means of the change in the second variable air space ($l_2$) between the second and third lens groups ($L_2$ and $L_3$).

In the first and third to fifth embodiments, the fourth lens group includes two positive lens elements and a negative lens element, wherein an air space of a positive meniscus shape convex to the image side is formed between the image side one of the two positive lens elements and the negative lens element. Such a fourth lens group is favorable to the correction of the lateral aberration in the shorter focal length side, and makes it possible to secure the necessary illumination for the marginal area of the image with a limited diameter of the fourth lens group.

With respect to the lens movements, the second lens group ($L_2$) and the fourth lens group ($L_4$) are cooperatively moved in the same speed in the first to fifth embodiments, while the movements in all of the three movable lens groups are each independent in the sixth embodiment.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. A zoom lens system comprising:
   a first lens group of a negative refractive power, said first lens group including a negative lens as the first lens at the object side end of the first lens group;
   a second lens group of a positive refractive power located on the image side of the first lens group with a first variable air space between the first and second lens groups, said second lens group including a pair of positive lenses, the object side one of the pair of positive lenses consisting of a biconvex lens element and a pair of negative meniscus lens elements, respectively, cemented on both sides of the biconvex lens element, and the image side one of the pair of positive lenses being a single lens element;
   a third lens group of a negative refractive power located on the image side of the second lens group with a second variable air space between the second and third lens groups, and
   a fourth lens group of a positive refractive power located on the image side of the third lens group with a third variable space between the third and fourth lens groups, wherein the first and third variable air spaces are reduced and the second variable air space is increased in accordance with the increase of the focal length of the whole lens system during the zooming operation.

2. A zoom lens system comprising:
   a first lens group of a negative refractive power;
   a second lens group of a positive refractive power located on the image side of the first lens group with a first variable air space between the first and second lens groups, said second lens group including a pair of positive lenses, the object side one of the pair of positive lenses consisting of a biconvex lens element and a pair of negative meniscus lens elements, respectively, cemented on both sides of the biconvex lens element, and the image side one of the pair of positive lenses being a single lens element;
   a third lens group of a negative refractive power located on the image side of the second lens group with a second variable air space between the second and third lens groups, and
   a fourth lens group of a positive refractive power located on the image side of the third lens group with a third variable air space between the third and fourth lens group, said fourth lens group including at least tow positive lens elements, a negative lens element and an air space of a positive meniscus shape convex to the image side formed between the image side one of the two positive lens elements and the negative lens element, wherein the first and third variable air spaces are reduced and the second variable air space is increased in accordance with the increase of the focal length of the whole lens system during the zooming operation.

3. The invention of claim 2, wherein the first lens group includes a negative lens as the first lens on the object side end of the first lens group.

4. The invention of claim 3, wherein the first lens group further includes at least two positive lens elements on the image side of the negative lens, and one negative lens element between the two positive lens elements.

* * * * *